(12) United States Patent
Druschel

(10) Patent No.: US 6,616,391 B1
(45) Date of Patent: Sep. 9, 2003

(54) SCREW FOR PLASTIC COMPOSITE LUMBER

(75) Inventor: Thomas P. Druschel, Florence, MA (US)

(73) Assignee: Olympic Manufacturing Group, Inc., Agawam, MA (US)

(*) Notice: Subject to any disclaimer, the term of this patent is extended or adjusted under 35 U.S.C. 154(b) by 0 days.

(21) Appl. No.: 09/835,499

(22) Filed: Apr. 16, 2001

(51) Int. Cl.[7] ................................ F16B 25/10
(52) U.S. Cl. .................... 411/387.2; 411/399; 411/412; 411/187
(58) Field of Search .................. 411/386, 387.1, 411/387.2, 387.3, 399, 411, 412, 413, 187, 388; 52/410

(56) References Cited

U.S. PATENT DOCUMENTS 3,916,757 A * 11/1975 Wilson ..................... 408/224
4,653,244 A * 3/1987 Farrell ..................... 411/399
4,987,714 A * 1/1991 Lemke ..................... 411/369
6,000,892 A * 12/1999 Takasaki ................... 411/187

FOREIGN PATENT DOCUMENTS

JP 0014167 * 2/1977 ................. 411/399

* cited by examiner

Primary Examiner—Flemming Saether
Assistant Examiner—Jori Schiffman
(74) Attorney, Agent, or Firm—Alix, Yale & Ristas, LLP

(57) ABSTRACT

A fastener for use in conjunction with plastic lumber is provided with an undercut head and radially projecting helical flutes on the shank which combine to contain plastic lumber material displaced by the shank and head beneath the head, permitting a single step installation to produce a finished appearance. The helical flutes have an opposed helical orientation to the screw threads. This opposed relationship causes the flutes to push displaced plastic lumber material away from the screw head while the flutes bore a space for plastic lumber material displaced by countersinking the screw head. The undercut head may be provided with a series of teeth around the underside of the head periphery. The teeth aid in penetrating the surface of the plastic lumber. The teeth also resist backing out of the screw.

15 Claims, 5 Drawing Sheets

SCREW FOR PLASTIC COMPOSITE LUMBER

BACKGROUND OF THE INVENTION

1. Field of the Invention

This invention relates generally to fasteners and fastening techniques for fastening decking to structural members. More particularly, the present invention relates to techniques for fastening plastic decking to the structural members of a deck.

2. Description of the Related Art

Decks have become an extremely popular addition to the modern home. Typically, the structural members of a modern deck are composed of pressure-treated yellow pine. Pressure-treated wood is preferred for the structure of a deck because of its reasonable cost and high resistance to insect and moisture damage. However, deck surfaces made of pressure treated yellow pine tend to check, split, cup, twist and splinter after prolonged exposure to the elements. In addition, yellow pine is a relatively soft wood and is subject to wear, particularly in high-traffic areas of a deck. In response to the deficiencies of pressure treated yellow pine decking, many homeowners and contractors are now specifying alternative materials for decking, such as redwood, cedar, manmade composite materials or tropical hardwoods.

Manmade composite materials (plastic lumber) are made from plastic such as polyethylene, sometimes in combination with wood particles and/or fiberglass. Frequently, the polyethylene is from recycled products such as plastic bags or the plastic jugs used to store water and milk. The fact that plastic lumber is produced from materials that would otherwise be burned or placed in landfills appeals to many ecologically minded homeowners. Plastic lumber does not absorb water, rot or splinter. It never needs staining or painting, although it accepts and holds paint as well as wood.

Conventional tools and fasteners can be used to install plastic lumber. Plastic lumber is extruded in a wide variety of standard and custom shapes, then cut to a user-specified length. Plastic lumber lacks some of the rigidity and strength of wood and therefore cannot currently be used for constructing the structural portion of a deck. Decking, railings and banisters are popular applications for plastic lumber. Joists used to support plastic decking are frequently required to be closer together than the 16 or 24 inches required for 5/4 and 2× wood decking, respectively. More joists make for a more expensive installation having more screws joining the decking to the structure. Plastic lumber currently costs significantly more than pressure treated decking, but is priced competitively with redwood or tropical hardwood decking. Because of the increased initial cost, plastic decking is frequently chosen for high-end deck installations.

Currently, the practice is to use conventional decking screws to fasten the plastic decking to the deck structural members. Plastic decking accepts screws well and the plastic material has self-lubricating properties that permit the screw to be easily driven below the surface of the decking. It is also possible to over-drive the screw, where the head of the screw passes most of the way through the decking. In addition, the plastic displaced by the shank of the screw has a tendency to "creep" up the shank of the screw during installation. The head of the screw tends to displace plastic radially during countersinking, often resulting in an irregular raised ring around the sunken head of the screw, which is commonly referred to as a "volcano".

To provide the finished appearance expected in a quality installation, the builder must then hammer or punch the material down over each screw. In some cases, the plastic material covers the screw head neatly. In other cases, a rough looking opening is left behind. When using a hammer, the worker must be careful to strike the deck surface flush to prevent leaving a hammer mark. Use of a punch eliminates the hammer mark problem, but either approach requires an extra installation step for each screw. Because decks using plastic decking require more floor joists, there are a greater number of screws to install. Even a modest deck requires hundreds of deck screws, making each additional step very expensive in terms of added labor.

There is a need in the art for a screw for use in conjunction with plastic lumber that can be installed in a single step and leaves a finished appearance without further treatment.

SUMMARY OF THE INVENTION

Briefly stated, the invention in a preferred form is a screw incorporating a sharp point angle, undercut head and a boring portion to contain displaced decking material below the screw head. As a result, a single-step installation produces a neatly countersunk appearance.

The screw head includes a circumferential undercut connected to the top surface of the screw head by a periphery oriented parallel to the screw axis. Converging conical surfaces define the v-shaped undercut that connects the periphery of the screw head to the shank of the screw. The junction of the periphery with the radially outer conical surface of the undercut forms a peripheral lip. In an alternative embodiment, this lip may be provided with unidirectional cutting teeth that initially improve countersinking and later help prevent the screw from backing out.

What would typically constitute an unthreaded portion of a deck screw in the prior art (extending from the head to the threaded portion of the shank) is in accordance with the present invention replaced with at least one radially projecting helical flute. The helical flute has a helical orientation opposed to that of the screw thread. The helical flute forms a boring portion that, during screw installation, pushes displaced deck material away from the surface of the decking while opening a larger diameter hole beneath the screw head. Decking material displaced by countersinking the screw head is contained beneath the head by the undercut head configuration. The material contained beneath the screw head during installation at least partially fills the hole reamed by the boring portion. A precisely defined sharp point angle and a sharp thread combine to help prevent material creep up the screw shank.

A single step installation of a screw in accordance with the present invention produces a neatly countersunk flush appearance.

An object of the present invention is to provide a new and improved fastener for fastening plastic or composite decking to a structural member.

Another object of the present invention is to provide a new and improved fastener that presents a finished appearance when installed through plastic or composite decking in a single efficient step.

A still further object of the present invention is to provide a new and improved fastener that does not exhibit the "volcano" effect when used in conjunction with plastic or composite lumber.

These and other objects, features and advantages of the invention will become readily apparent to those skilled in the art upon reading the description of the preferred embodiments, in conjunction with the accompanying drawings.

DETAILED DESCRIPTION OF THE PREFERRED EMBODIMENT

With reference to the drawings wherein like numerals represent like parts throughout the Figures, a preferred embodiment of a deck screw in accordance with the present invention is generally designated by the numeral 10. Deck screw 10 is especially adapted for assembling plastic or composite decking to a support structure such as may be employed in constructing a high quality outdoor deck addition to a home.

Recent trends in deck construction have seen an increase in the use of plastic and composite materials to form the walking surface of the deck. One example of composite decking is marketed under the TREX® brand. Plastic decking is desirable because it is impervious to moisture and never needs painting. Plastic decking is also seen as an environmentally friendly product because it usually contains a significant percentage of recycled plastic. Plastic decking does not split, check or splinter, making a safe splinter free surface for bare feet and children. Plastic or composite materials (hereinafter referred to as "plastic lumber") are significantly more expensive than standard pressure treated yellow pine decking. A quality installation is essential to preserve the significant investment in material.

Figure 5:
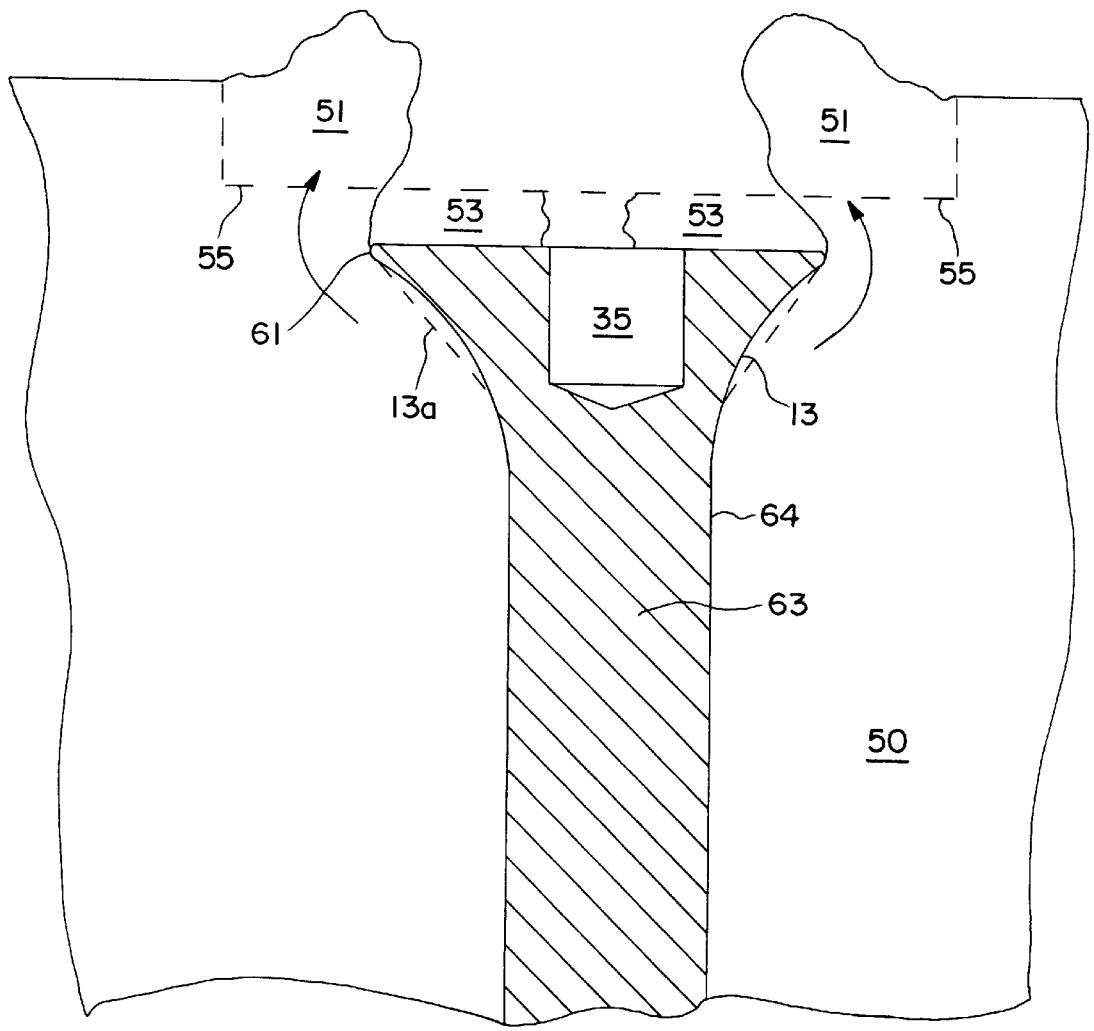
FIG. 5 is an enlarged sectional view of a prior art screw installed through a section of plastic decking.

Plastic lumber is available in standard lumber dimensions (5/4 and 2x) as well as custom configurations. Plastic lumber can be cut, shaped and installed using standard tools and fasteners. Using standard deck screws, however, typically results in a raised ring, or "volcano" 51 around the countersunk screw head as illustrated in FIG. 5. The volcano 51 is composed of displaced plastic material that creeps up the shank of the screw during installation as well as plastic material displaced as the screw head is countersunk into the plastic decking. The profile of the underside of a standard deck screw is either a concave 13 or a straight 13a conical surface that displaces the plastic decking material radially. The resulting ring 51 of displaced material must be flattened (at 53) in a separate step to provide a neat appearance and smooth surface. Even when flattened 53, the displaced material can have an irregular appearance which is not aesthetically pleasing.

It should be understood that the length, thread height, threaded length and head diameter of a screw in accordance with the present invention may be varied without departing from the spirit and scope of the present invention. A deck screw 10 in accordance with the present invention is configured to be used in conjunction with a plastic lumber product having a particular thickness, with the axial dimensions of the screw being extended for thicker lumber. The illustrated embodiment 10 is configured for use in conjunction with plastic lumber having a thickness of approximately 1.25" (also referred to as 5/4 decking).

Figure 1:
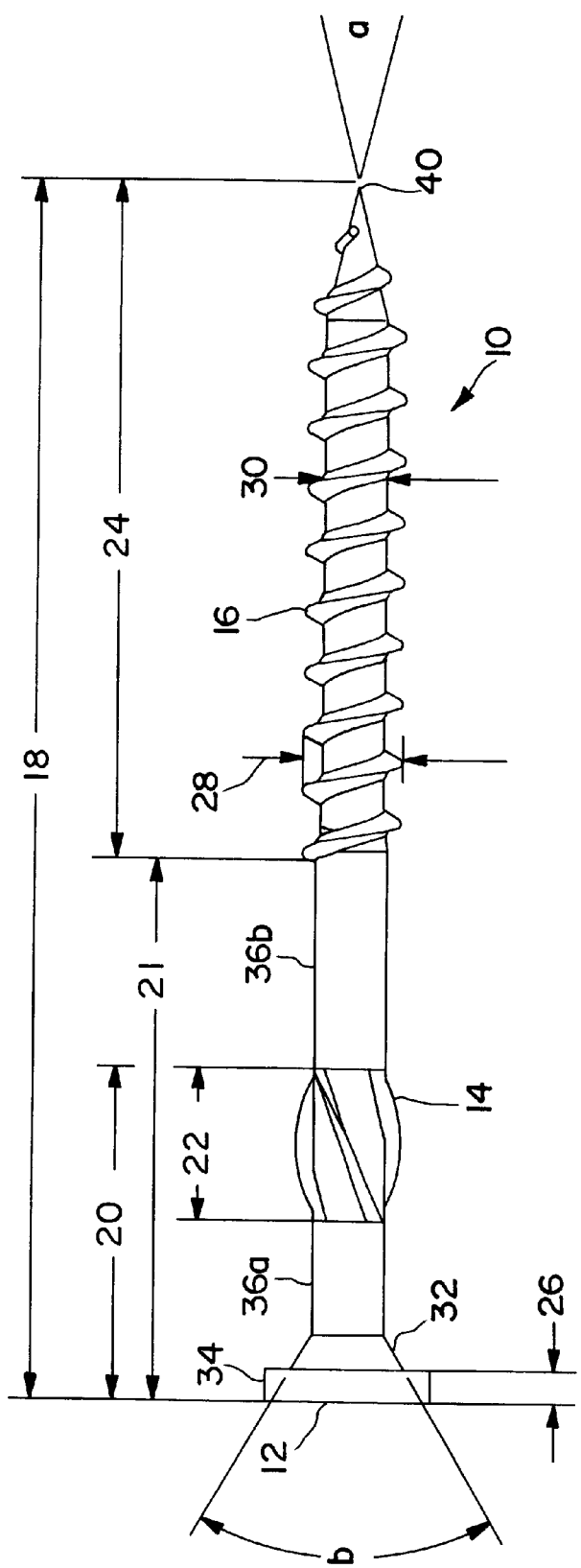
FIG. 1 is a side elevational view of a screw in accordance with the present invention.
Figure 2:
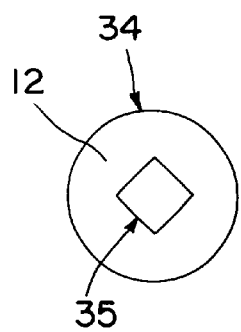
FIG. 2 is a top view of the screw of FIG. 1.

With reference to FIG. 1, a preferred embodiment of a screw 10 in accordance with the present invention incorporates several features that enable the screw to present a neat, finished appearance after a simple single-step installation.

Figure 3:
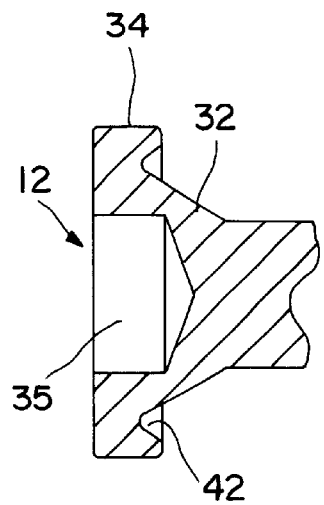
FIG. 3 is an enlarged fragmentary side sectional view of the screw of FIG. 1.
Figure 3A:
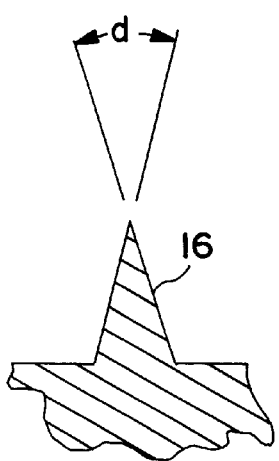
FIG. 3A is a sectional fragmentary view through a thread of the screw of FIG. 1.
Figure 4:
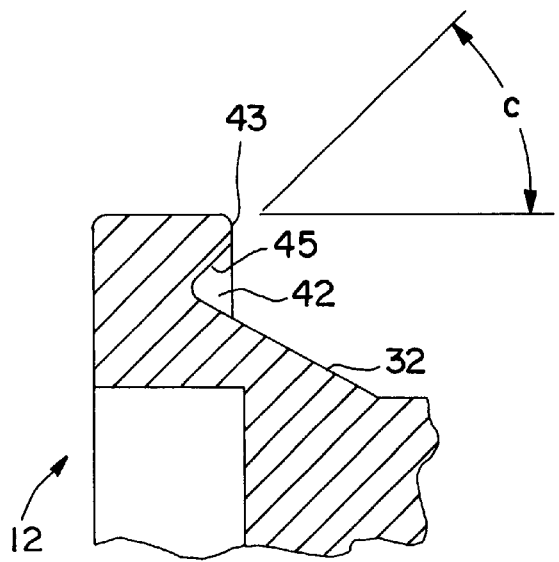
FIG. 4 is an enlarged fragmentary view of the sectional view of FIG. 3.

The tip 40 of the screw 10 has a sharp 20° point angle. A single spiral thread 16 begins with a tapered portion near the tip 40 and extends the length of the threaded portion 24 of the screw 10. The threaded portion 24 extends approximately 1.375" from the tip 40 toward the head 12 of the screw 10. FIG. 3A illustrates a cross section through the thread 16. Two convergent helical surfaces meeting at an angle d of approximately 30° form the thread. The thread 16 has a major diameter 28 of approximately 0.189" and a root diameter 30 of approximately 0.134". The sharp point 40 and sharp thread 16 are configured to minimize creeping of composite material up the screw during installation.

Between the threaded portion 24 and the head 12 of the screw are two unthreaded shank portions 36a, 36b separated by a boring portion 22. The boring portion 22 includes 4 helical flutes having a reverse or left-hand helical configuration. The flutes are substantially identical and oriented at approximately 25° to the axis of the screw 10. The flutes project radially from the shank approximately 0.02" and extend axially for approximately 0.25". The dimensions of the helical flutes can be adjusted without departing from the spirit and the scope of the present invention.

The boring portion 22 serves two functions which are best discussed with reference to FIG. 6. First, the reverse threaded configuration of the boring portion 22 exerts an axial force on the plastic lumber material 50 immediately surrounding the shank of the screw in opposition to decking material attempting to creep up the shank. Second, as the screw is driven, the boring portion 22 opens a hole 52 in the plastic lumber material 50 having a diameter that is greater than the screw shank. The function of this larger diameter hole will be discussed below.

The head 12 preferably has a special configuration best illustrated in FIGS. 2–4, 7 and 8. The head 12 has a flat upper surface including a torque-receiving socket 35. A #2 square drive socket is illustrated, however, any torque receiving socket or slot is equally applicable. The outer perimeter 34 of the head is substantially parallel to the axis of the screw. The underside of the head includes a v-shaped circumferential undercut 42 surrounded by a peripheral lip 43. A conical surface 45 in the undercut 42 connects the lip 43 with the conical underside 32 of the head 12. The conical surface 45 slants away from the lip 43 toward the axis of the screw at an angle c of approximately 45°. This head configuration works in conjunction with the boring portion 22 of the shank to avoid displacing the plastic lumber material in a radial direction like the prior art fasteners.

Figure 7:
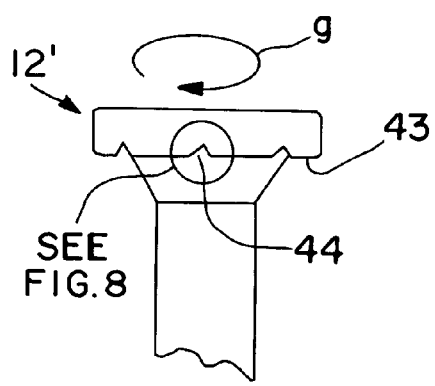
FIG. 7 is a side elevational view of the head portion of an alternative embodiment of a screw in accordance with the present invention.
Figure 8:
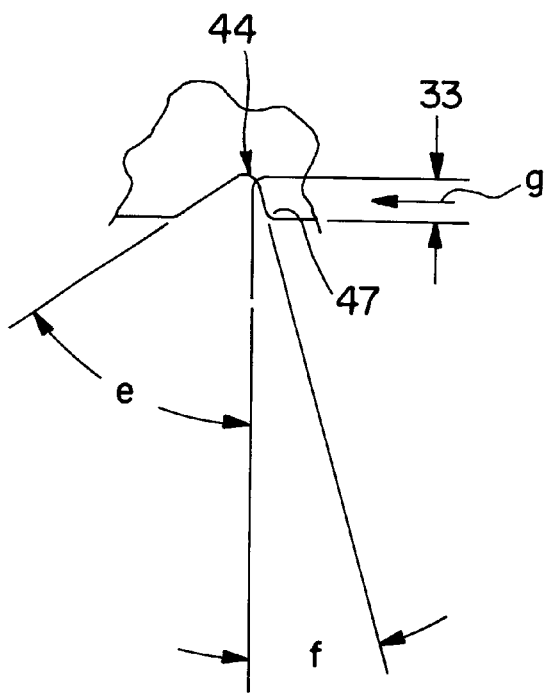
FIG. 8 is an enlarged fragmentary view, partially in diagrammatic form, of the head portion of FIG. 7.

In an alternative embodiment of a screw head 12' illustrated in FIGS. 7 and 8, the lip 43 is provided with a series of angled notches 44 that define unidirectional cutting teeth 47 around the lip 43. All the screws illustrated in this application are configured to be installed with a standard right-hand rotation as indicated by arrow g. Each notch comprises a leading angle e of approximately 55° and a trailing angle f of approximately 15°. The purpose of this configuration is to form a cutting tooth 47 that cuts in the direction (g) of screw installation. The cutting teeth 47 help the head 12' so equipped penetrate the surface of the plastic lumber cleanly, further enhancing the finished appearance of the installed screw.

In the typical prior art fastener 63, illustrated in FIG. 5, the underside of the head 13, 13a connects the shank 64 directly to the peripheral edge 61 of the head. This configuration inevitably displaces the plastic material radially, resulting in the rim 51 of displaced material.

Figure 6:
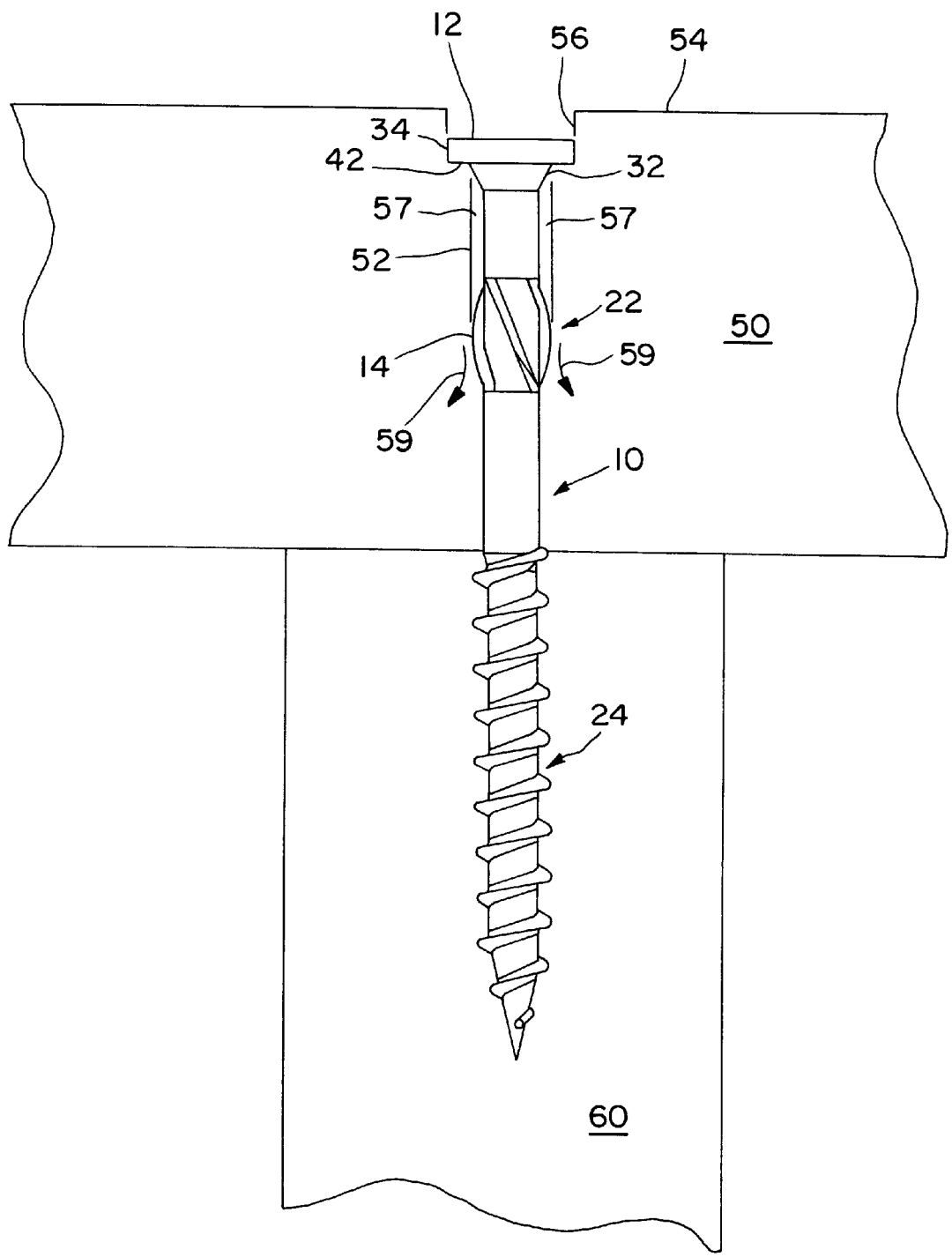
FIG. 6 is a side elevational view, partly in section and partly broken away, of the screw of FIG. 1 in an installed configuration.

With reference to FIG. 6, during installation of a screw 10 in accordance with the present invention, the flutes 14 of the boring portion 22 force material displaced by the shank of the screw down and away from the screw. Axially above the boring portion 22, an enlarged bore 52 has been reamed out by the flutes 14, the removed material being forced down and away from the screw along arrows 59. When the head 12 of the screw comes in contact with the surface 54 of the plastic decking 50, the v-shaped undercut 42 contains displaced material beneath the head of the screw and forces the material 57 downward into the void left behind by the boring portion 22. The periphery 34 of the screw head 12 is parallel to the axis of the screw and therefore cuts into the surface 54 without displacing the decking material 50 radially. The result is a neat countersink 56 and a screw head that is flush with or below the surface of the lumber. No further steps are needed to present a professional finished appearance.

The undercut head configuration also has the advantage of resisting overdriving of the screw 10. Overdriving occurs when the screw penetrates too far through the plastic lumber. This can occur using standard screws because the plastic lumber material is self-lubricating. A conventional screw penetrates the plastic lumber very easily, with displaced plastic material moving around the head of the screw. The undercut head configuration of a screw 10 in accordance with the present invention creates resistance to screw penetration by containing displaced material beneath the screw head 12, making excessive penetration more difficult.

High torque screw guns or variable speed drills are often used to install screws in the construction trades. These tools can achieve rotational speeds between 2500 and 4000 rpm. The head of a conventional prior art construction screw slips through the self-lubricating plastic lumber so easily that the worker must carefully control each installation to prevent over-penetration. This significantly slows each screw installation and makes the result dependent upon the skill and attentiveness of the worker.

The undercut head configuration of the screw 10 provides a clear demarcation between driving torque and seating torque. As a result, installation of a screw 10 requires less care to achieve consistently good results. The installation of each screw 10 can be achieved at closer to the full torque and speed of the installation tool. This has the added and unexpected benefit that the plastic material adjacent the boring portion 44 of the screw 10 is frictionally heated and at least partially melted during installation. The melted material cools and hardens around the flutes 14 of the boring portion 22 to lock the screw 10 in its installed configuration, preventing the screw from backing out over time.

Decks installed in outdoor environments are exposed to wide fluctuations in temperature and humidity, which lead to expansion and contraction of the deck structure and plastic lumber attached to the structure. These cycles of expansion and contraction can produce forces on fasteners that cause the fasteners to back out of their installed position. Plastic lumber can soften and expand when heated. Softened plastic lumber can expand or work upwards around the head of a conventional prior art fastener, eventually resulting in a warped or buckled appearance. This condition can be difficult to correct because the head of a conventional fastener is buried in the plastic lumber.

The undercut head 12, 12' of the screw 10 resists over-penetration of the plastic lumber and maintains the plastic lumber in a tightly clamped relationship to the deck support structure. The unidirectional cutting teeth 47 also deform the plastic material during installation so that the material fills each notch 44 under the installed screw 10. Thus, the undercut head 12, boring portion 22 flutes 14 and unidirectional cutting teeth 47 and notches 44 in combination produce a screw 10 with improved resistance to forces produced by cycles of expansion and contraction. The screw 10 remains locked in the plastic lumber and holds the plastic lumber securely to the deck structural members to maintain the integrity of the deck surface over time.

A preferred material for the screw 10 is steel. Steel can be hardened and heat-treated to produce a screw 10 that will withstand the rigors of installation while providing superior shear strength. Steel screws are preferably provided with a premium rust inhibiting coating, such as zinc plating covered with a yellow dichromate top-coat. Other rust inhibiting coatings are also possible. Stainless steel may also be used.

The overall axial length 21 of the unthreaded portions 36a, 36b combined with the boring portion 22 is configured to approximate the thickness of the plastic lumber 50. As illustrated in FIG. 6, it is preferred that the threaded portion 24 of the screw be engaged with the structural member 60 only. The plastic lumber 50 is able to move axially on the shank of the screw during installation and is held in a clamped relationship between the screw head 12 and the structural member 60 when the screw 10 is fully installed.

The screw has been described in conjunction with plastic lumber. It should be understood that many of the attributes and features of the screw are useful in conjunction with standard wood products.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A fastener for fastening plastic lumber to a structural member comprising:

a head having a periphery, an underside defining a circumferential v-shaped undercut surrounding said shank, a circumferential lip defined by the junction of a radially outward portion of said underside with said periphery and a socket for receiving a torque applied thereto, said circumferential lip comprising a series of notches defining cutting teeth configured to cut in a direction of screw rotation during installation; and a shank comprising an unthreaded portion axially extending from said head, a threaded portion axially extending from a tip toward said head, said threaded portion including at least one helical thread, and a boring portion disposed between said threaded and unthreaded portions, said boring portion including at least one radially projecting helical flute, wherein said helical flute has an opposite helical orientation to a helical orientation of said at least one helical thread.

2. The fastener of claim 1, wherein said at least one helical flute comprises a plurality of substantially identical equiangularly spaced helical flutes.

3. The fastener of claim 1, wherein the helical orientation of said helical flute is a left-hand helical orientation.

4. The fastener of claim 1, wherein said tip has a point angle of approximately 20°.

5. The fastener of claim 1, wherein said fastener is comprised of steel.

6. A fastener for fastening plastic lumber having a pre-established thickness to a structural member, said fastener having an axis and comprising:
- a head having a top surface comprising a means for receiving a torque applied thereto, an axially extending periphery substantially parallel to said axis, said periphery extending from said top surface to a circumferential lip that defines a radially outer boundary of an underside of said head, said circumferential lip comprising a series of notches defining cutting teeth, the underside of said head including a first conical surface projecting from said lip axially toward said top surface and a second conical surface converging with said first conical surface to define a v-shaped undercut, said second conical surface extending axially away from said convergence and toward said axis;
- a shank defining an axis comprising a first unthreaded portion axially extending from a junction with said second conical surface, a boring portion comprising at least one radially extending helical flute, said helical flute having a left-hand helical configuration, a second unthreaded portion axially extending from said boring portion and a threaded portion axially extending from said second unthreaded portion, said threaded portion comprising at least one helical thread having a right-hand helical configuration, said threaded portion axially terminating at a tip,
- wherein said cutting teeth are configured to cut in a direction of screw rotation during installation, the total axial length of said first unthreaded portion, boring portion and second unthreaded portion is substantially equal to said pre-established thickness and said boring portion opens a hole in said plastic lumber during screw installation, said hole having a diameter greater than a diameter of said first unthreaded portion.

7. The fastener of claim 6, wherein said at least one helical flute comprises a plurality of substantially identical equiangularly spaced helical flutes.

8. The fastener of claim 6, wherein said fastener is constructed of steel.

9. The fastener of claim 6, wherein said tip has a point angle of approximately 20°.

10. The fastener of claim 6, wherein said at least one helical thread comprises two convergent thread surfaces meeting at an angle of approximately 30°.

11. A plastic lumber and substructure assembly comprising:
- a plastic lumber member having a first thickness, an upper surface and a lower surface;
- a structural member adjacent to said lower surface; and
- a fastener fastening said plastic lumber member to said structural member, said fastener comprising:
  - a head having a top surface and a socket for receiving a torque applied thereto, a periphery, an underside defining a v-shaped undercut axially opposed to said top surface and a circumferential lip defined by a junction of said underside with said periphery, said circumferential lip defining a plurality of cutting teeth configured to cut in a direction of screw rotation during installation; and
  - a shank comprising an unthreaded portion axially extending from said head, a threaded portion axially extending from a tip toward said head and a boring portion disposed therebetween, said boring portion having at least one radially projecting helical flute, said threaded portion including at least one helical thread, said helical flute having an opposite helical orientation to a helical orientation of said at least one helical thread,
  - wherein said fastener unthreaded portion extends through said plastic lumber member, said threaded portion threadably engages said structural member, said helical flute displaces plastic lumber material around said shank to provide a bore having a diameter greater than a diameter of said unthreaded portion and said top surface is flush with or below said upper surface with at least some of said plastic lumber material displaced by said head at least partially filling said bore.

12. The assembly of claim 11, wherein said at least one helical flute comprises a plurality of substantially identical equiangularly spaced helical flutes.

13. The assembly of claim 11, wherein the helical orientation of said helical flute is a left-hand helical orientation.

14. The assembly of claim 11, wherein said head has a periphery, an underside defining a v-shaped undercut axially opposed to said top surface and a circumferential lip defined by a junction of said underside with said periphery.

15. The assembly of claim 11, wherein plastic lumber material displaced by said helical flute is at least partially melted during fastener installation and subsequently hardens around said unthreaded shank portion, locking said fastener in substantially fixed rotational position within said plastic lumber member.

* * * * *